United States Patent [19]
Kemp

[11] Patent Number: 4,790,544
[45] Date of Patent: Dec. 13, 1988

[54] EXPANSIBLE SEAL

[75] Inventor: Christian F. Kemp, Kurt Schumacher Str., Fed. Rep. of Germany

[73] Assignee: Raychem GmbH, Putzbrunn, Fed. Rep. of Germany

[21] Appl. No.: 110,057

[22] Filed: Oct. 13, 1987

Related U.S. Application Data

[63] Continuation of Ser. No. 912,172, Sep. 25, 1986, abandoned, which is a continuation of Ser. No. 684,998, Dec. 21, 1984, abandoned.

[30] Foreign Application Priority Data

Dec. 19, 1983 [GB] United Kingdom .................. 8333722

[51] Int. Cl.$^4$ .............................................. F16J 15/46
[52] U.S. Cl. ..................................... 277/34; 277/204; 277/226; 277/220
[58] Field of Search ................... 277/1, 34, 34.3, 34.6, 277/204, 220–222, 226

[56] References Cited

U.S. PATENT DOCUMENTS

| | | | |
|---|---|---|---|
| 907,136 | 12/1908 | Farrington et al. | 277/207 A |
| 2,099,722 | 11/1937 | Byers | 277/34 |
| 2,309,658 | 2/1943 | Miller | 277/34 |
| 2,616,736 | 11/1952 | Smith | 277/221 X |
| 2,666,962 | 1/1954 | Tripp | 49/370 X |
| 2,816,575 | 12/1957 | Stokes | 277/222 X |
| 2,822,192 | 2/1958 | Beatty | 277/34 |
| 3,038,732 | 6/1962 | Scott et al. | 277/34 |
| 3,125,346 | 3/1964 | Poltorak | 277/34 |
| 3,339,011 | 8/1967 | Ewers et al. | 277/34 X |
| 3,339,931 | 9/1967 | Hundt et al. | 277/34.3 |
| 3,415,287 | 12/1968 | Heslo et al. | |
| 3,758,916 | 9/1973 | Wetmore | |

FOREIGN PATENT DOCUMENTS

| | | | |
|---|---|---|---|
| 727940 | 2/1966 | Canada | 277/34.3 |
| 062298 | 10/1982 | European Pat. Off. | |
| 3213414 | 10/1983 | Fed. Rep. of Germany | |
| 3215250 | 10/1983 | Fed. Rep. of Germany | |
| 2407414 | 5/1979 | France | |
| 49-3649 | 1/1974 | Japan | |
| 49-3650 | 1/1974 | Japan | |
| 494402 | 10/1938 | United Kingdom | |
| 544003 | 3/1942 | United Kingdom | |
| 915878 | 1/1963 | United Kingdom | |
| 993384 | 5/1965 | United Kingdom | |
| 1065922 | 4/1967 | United Kingdom | |
| 1077314 | 7/1967 | United Kingdom | |
| 1421960 | 1/1976 | United Kingdom | |
| 1485621 | 9/1977 | United Kingdom | |
| 2006890 | 5/1979 | United Kingdom | |
| 1569616 | 6/1980 | United Kingdom | |
| WO81/01452 | 5/1981 | World Int. Prop. O. | |
| WO83/01288 | 4/1983 | World Int. Prop. O. | |

Primary Examiner—Robert S. Ward
Attorney, Agent, or Firm—Edith A. Rice; Herbert G. Burkard

[57] ABSTRACT

A seal in an aperture, e.g., a duct, is made by foaming a foamable substrate within an envelope in the aperture, to expand the envelope, which desirably has sealant or adhesive on its outer surface, to conform it into sealing engagement with the aperture. The envelope is closed and is of wraparound configuration so as to seal a large variety of aperture sizes, whether empty or containing objects, such as cables.

13 Claims, 4 Drawing Sheets

U.S. Patent    Dec. 13, 1988    Sheet 1 of 4    4,790,544
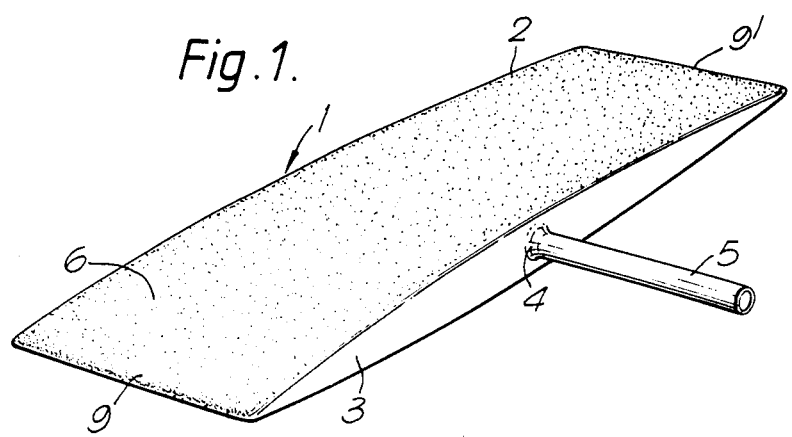
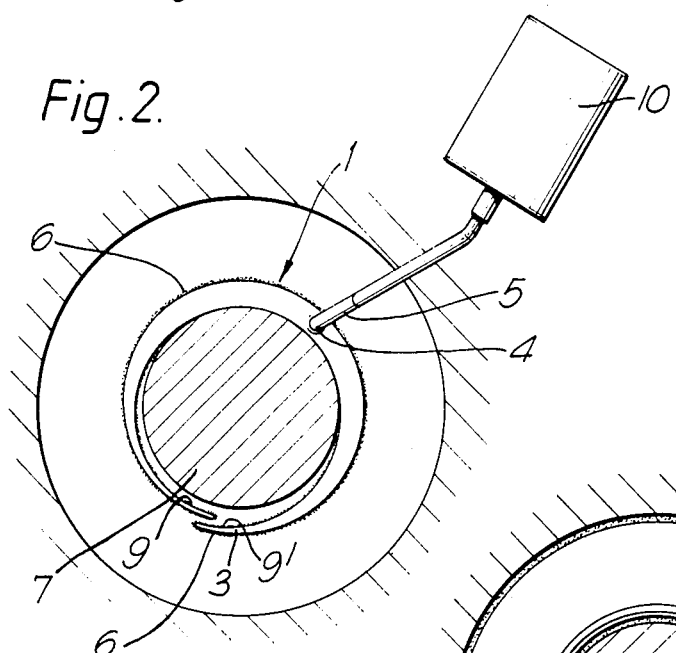
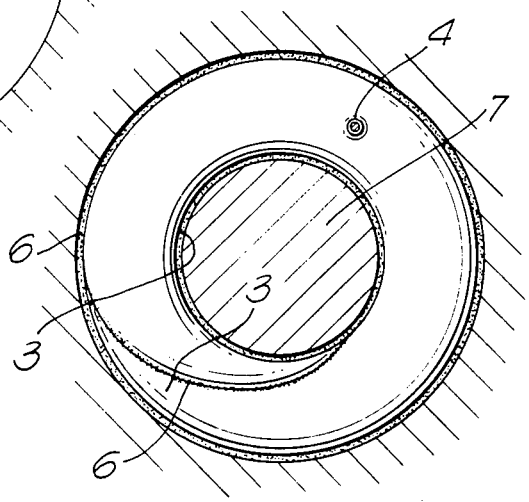

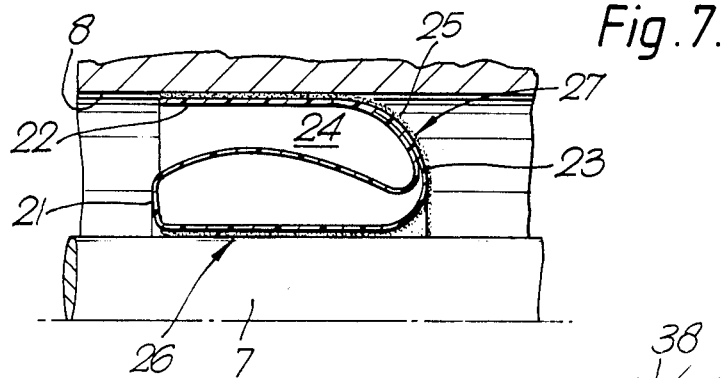
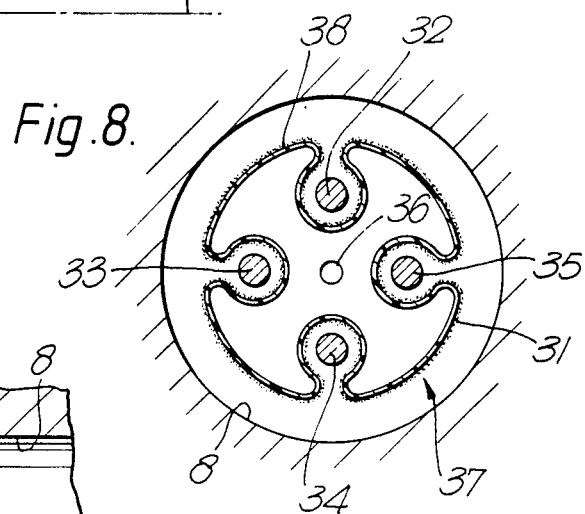
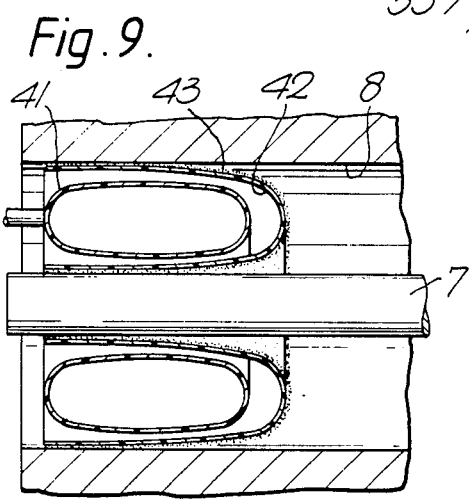
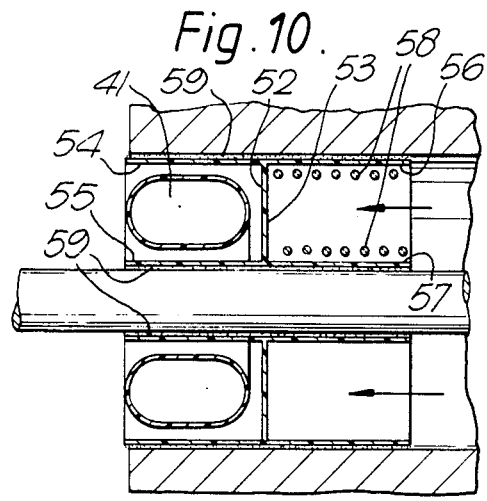

EXPANSIBLE SEAL

This application is a continuation, of application Ser. No. 912,172, filed Sept. 24, 1986, and now abandoned which is a continuation, of application Ser. No. 684,998, filed 12/21/84, now abandoned.

This invention relates to sealing, and especially to sealing an aperture, more especially a space between an elongate substrate and an aperture adjacent, for example enclosing, the elongate substrate.

It is often necessary to enclose part of an elongate substrate to protect that part of the substrate from the environment, for example where it is necessary to protect a joint in an electric cable or other equipment or for protection of service lines such as oil pipes. In such cases it is necessary to provide a reliable seal between an outer cover, for example a splice case, and the enclosed substrate, for example, a cable jacket and also between any different parts of the cover that are joined together. Another type of seal is a duct seal, where a seal is needed between a cable, for example, and a wall, or bulkhead duct through which it passes. A further type of duct seal is one in which a duct designed to carry a cable is empty, and it is necessary to block off the duct completely until the cable is installed.

The reason that a seal (rather than an adhesive bond of no significant thickness) is required in the first two instances is a disparity in size or shape between the outer surface and the elongate substrate or substrates. For example, a duct may be from several millimeters to several centimeters greater than the cable it carries, or the installed size of a cover may be larger than a cable it is desired to seal. Also, when a branch-out between two or more substrates is to be sealed it will generally be necessary to convert the concave surface at the crutch region to a convex or straight surface that can be enclosed by, say, half shells or a recoverable sleeve.

Such seals have usually been formed by the use of a conformable sealing member, for example an O-ring, or the use of a mass of sealant or hot-melt adhesive. Whilst these seals in general work in a satisfactory manner, problems sometimes occur. For example, by their nature, conformable sealing members have a low modulus and, especially where they are used to fill large voids, may have a tendency to creep over extended periods of time. Also in some circumstances leak paths occur if it has not been possible to introduce sufficient heat into a hot-melt adhesive seal to melt the adhesive. The leak paths may permit, for example, ingress of moisture to a sensitive area, or in the case of a pressurized cable, egress of the pressurizing fluid.

It has also been proposed, in British Specification No. 1,485,621, to pump foamable material into the duct to fill the space between the cable or cables and the duct. Since, however, the foamable material is not in any way constrained against penetration of the duct, much material may be consumed before the duct is closed, with resulting waste both of time and material, and leak paths at the interfae between the foamed material and the duct are possible and difficult to detect.

It is known from International Patent Apllication Publication No. WO 81/01452 to dispose a sealing element comprising a hardening filling medium within a flexible enclosing duct for example. Air is employed to exert pressure on the filling medium as it hardens. UK Patent Specification No. 1065922 discloses an essentially similar arrangement, but whereby an expansible foam is injected into a envelope to effect sealing of an annular gap. However, in each of these publications, the sealing element is of preformed annular configuration, and thus has limited versatility.

There accordingly remains a need for a versatile method and device to seal ducts and similar apertures, whether carrying an elongate conduit or not, and to seal portions of, e.g., joints in, such conduits.

The present invention provides in one aspect a method for sealing an aperture, comprising inserting a flexible envelope in the aperture, the envelope preferably having an adhesive or sealant on at least part of its outer surface, wrapping the envelope over on to itself, introducing into the envelope an expansible or expanding filler material, and causing or allowing expansion of the material in the installed envelope so as to cause the outer surface of the envelope, or an additional element on or associated with the envelope, to come into sealing engagement with the interior wall of the aperture.

In accordance with a further aspect of the present invention, there is provided an assembly for sealing an aperture, comprising a flexible envelope that is arranged to be wrapped on to itself for insertion into an aperture, the envelope having an opening therein for receiving an expansible or expanding filler material for expanding the envelope, a container containing said expansible filler material, and means arranged to connect the container to the envelope to conduct the filler material thereto for effecting expansion of the envelope.

By arranging for the envelope to be wrapped around on to itself, for example in a spiral configuration, one size envelope can be used to seal apertures, such as ducts, of a variety of sizes, and can do so even if the aperture contains one or more substrates, such as an electric cable, of a variety of sizes. Thus, the aperture does not have to be of a regular shape, and one configuration of envelope may be used to seal apertures of a variety of shapes. The amount of overlap will thus depend, for an envelope of given size, on the crosssectional size of the aperture and on the size of any substrate therein. It is envisaged that the majority of cable ducts, for example, may be sealed by the method and assembly of the present invention using an envelope of one of only two sizes. The annular configuration of known envelopes, on the other hand, does not have this versatility, being confined for use with annular apertures, and then to aperture of a very limited range of sizes.

The aperture to be sealed by the method and assembly of the invention rather than being of irregular configuration, may also be of well-defined, for example annular configuration. In this respect, sealing may be effected between two elongate objects, such as pipes, in a bell and spigot configuration, where the end of one pipe, for example, fits into the end of another, or into a short piece of interconnecting pipe, and the sealing assembly is located in the annular space therebetween.

The filler material may be introduced into the envelope before, during, or after the installation of the envelope in the aperture. If the material is in the envelope before installation, however, the envelope thus being closed, it should desirably not expand to any significant extent until after installation. For example, if the material is a foamable material, which is presently preferred, foaming may be caused by mixing components already in the envelope but separated in compartments in the envelope or otherwise prevented from reacting together. For example, the envelope may be divided into two compartments by an external clip that is removed as or after the envelope is installed in the aperture, or one component, for example a fluid, may be contained in an internal envelope that may be punctured at or after installation. Alternatively or as well, one component of a reaction mixture may be in the form of coated particles, the coating of which is water-soluble, the components being intermixed but unreactive in the absence of an activator, for example water, that dissolves the coating.

Preferably, however, the envelope may be provided with an opening through which one or more of the components may be introduced when the envelope is installed in the aperture. For example, water may be introduced to cause reaction of dry components already in the envelope, or a foamable or foaming mixture may be introduced through the opening when the envelope is installed. It may or may not be necessary to close such an opening after the envelope has formed the seal. Especially where the material is introduced under pressure, the opening may be provided with a one-way valve, to allow the material to pass only into the envelope. A tube may be connected to the opening to facilitate introduction of the material into the envelope. This is especially advantageous when the envelope is to be filled in situ, so pouring of the material into the envelope may be effected outside the confines of the aperture.

Advantageously, the envelope is installed in the aperture with the opening directed towards the interior thereof. By this means, any excess filler material, escaping, for example, from an envelope valve that is arranged to open at a predetermined overpressure so as to avoid overfilling of the envelope, will tend not to flow out of the aperture, but will flow into the aperture and thus tend to enhance sealing of the duct. Access to the opening on installation, to introduce the expanding or expansible material into the envelope may then conveniently be obtained along a tube fitted at one end to the opening and extending past the envelope to the exterior of the duct. A container containing the expansible material under pressure may then be connected to the outer end of the tube. The container may be a two-part container, that is to say may have two compartments containing respective components of the filler material that are arranged to be mixed just prior to ejection from the container through a nozzle. Alternatively, each filler component may issue separately from its container and be mixed in the tube itself on its way to the envelope.

The method is applicable, by way of example only, to sealing an empty duct, in which case the envelope is advantageously simply inserted into the duct, wrapped on to itself so as not to leave a pathway longitudinally into the duct, and expanded until its outer surface contacts the wall of the duct. Subsequently, the seal may be removed, to allow introduction of a substrate, by cutting open the envelope and, for example, applying a solvent to the expanded material, or a mechanical means may be provided to pull out the material within the envelope. When used to seal a duct containing one or more cables, the envelope is advantageously wrapped in overlapping fashion around the cable or cables, in which case it is preferred that at least one of the portions of the outer surface of the envelope that contact each other at the overlap is provided with adhesive or sealant, and expanded until its outer surface contacts the wall of the duct. When used to seal a joint between, for example, electrical cables, the envelope is advantageously wrapped around the joint in overlapping fashion, at least one overlapping portion being provided as above with adhesive or sealant, and an outer cover, for example a case, positioned around the envelope. The envelope is then expanded into contact with the interior wall of the case. It will be appreciated that, if sealing is desired around a substrate in the aperture, adhesive or sealant is provided on the appropriate part of the surface of the envelope or additional element. Advantageously, all parts of the outer surface of the envelope and, if present, all parts of the additional element, that come into sealing engagement with the interior of the aperture, or with any substrate therein, have adhesive or sealant thereon.

When the aperture contains two or more elongate objects, for example cables, it may be desirable to provide a quantity of sealant or adhesive, preferably sealant, between them, to ensure a seal across the whole area of a cross-section of the aperture, if such is desired. The adhesive or sealant may be mounted on a substrate that preferably is deformable, for example comprising foam material, to assist conformity to the objects in the aperture, and thereby to enhance sealing to those objects. Alternatively, the envelope may be shaped to conform to individual elongate objects, as will be described below in more detail with reference to the drawings. If the substrate within the aperture is not stationary, e.g., it is a rotatable shaft, then sealing may be effected around, or using, a material that provides an appropriate bearing surface, e.g., PTFE.

The material of the envelope should, as indicated above, be flexible, to allow the envelope to change in shape, size, or both with expansion of the material. Such changes may be such as to alter the total volume of the envelope without increasing its surface, e.g., a flattened envelope may become more open in cross-section, or they may be accompanied by stretching of the envelope material by the pressure exerted on it by the expanding material. The extension under pressure, which may be of the order of 7 atmospheres, should desirably not be such that the envelope material exceeds its yield point. Depending on the particular application, the material of the envelope may advantageously be resistant to some or all of oil, fuel, rodents. The envelope material is, for most applications, desirably not elastomeric, since that property would, in most applications, militate against the desired sealing effect. The envelope may be of thermoplastic which is advantageously cross-linked, and may, for example, be in film form, a fabric, or of fibrous material, of any natural or synthetic fibre, and may be closed completely or closed other than at the opening mentioned above. Alternatively, part or the whole of the outer surface may be perforated or otherwise permeable. The perforations, if present, are desirably sized to allow a small proportion of the expansible material to pass through them out of the envelope and contact the wall of the aperture and any substrate within it to enhance the sealing, for example by keying the envelope to the restraining wall or the substrate. The dimensions and number of the perforations, if present, will depend on the nature of the expanding material. Desirably, if any part of the envelope is permeable, the permeability is confined to those parts of the surface that will contact the aperture wall and, if present, an elongate substrate.

If the envelope is of fabric, for example fibre-reinforced PVC or silicone-coated Nomex, it may be coated to seal the interstices, if desired. This is, however, not essential, especially if the outer surface has an adhesive or sealant applied thereto. If the envelope is completely closed, it has the advantage that it restrains escape of blowing agent from within it, at least for a time sufficient to allow the foamed material to develop rigidity or stability.

In many sealing applications, including that, for example, of sealing a duct, whether empty or containing one or more power or communication cables, it is required to provide sealing against the propagation of fire. To this end, at least one, and preferably both, of the edges of the envelope that are directed towards the interior and towards the exterior of the aperture are coated with a layer of fire resistant, and preferably intumescent material. The material may be a fire resistant foam material that on expansion when exposed to heat (either on installation of the envelope, or on exposure to fire) forms itself into a rigid layer. As an alternative, the intumescent material may be flexible, such as a mastic. In the latter case, the flexible material may be coated on to the envelope and advantageously covered by a layer of permeable material. On expansion of the envelope, the intumescent material will then be exuded through the permeable layer, and can be pressed to form a smooth surface, when at the outer side of the aperture. Alternatively, or additionally, the filler material of the envelope may itself provide an effective fire seal, for example by comprising an intumescent foam, which will maintain the fire seal even if the envelope itself has burnt away. As a further alternative or addition, the material of the envelope may be made of a fire resistant material.

The construction of the envelope will depend to some extent on the shape of the aperture, which may be cylindrical, for example of circular or rectangular cross-section, or may be tapered or flared, including a duct provided with a bell-end. Advantageously, however, if the envelope is seamed or welded, it is V-sealed, that is, the envelope material within the envelope is so oriented that an increase in internal pressure tends to close the seam or the weld, rather than to open it. The envelope may contain means, e.g., an internal wire, to prevent its being flattened while empty during its insertion into the aperture. This avoids the possibility that flow of the expansible material into the envelope is hindered.

The dimension of the envelope in the axial direction of any elongate substrate positioned in the aperture may desirably be as long as is necessary to assure obtaining the desired seal. In the direction transverse to the axis, the dimension should desirably be such that when the envelope is expanded sealing contact is made along the whole circumference of the aperture (which is normally one closed in cross-section) and any object or objects present therein.

The method of the invention is advantageously carried out by inserting the envelope, wrapped around the object or objects if any are present in the aperture, in an axial direction relative to the aperture, that is, in the case of a duct, in the direction of the axis of the duct. The envelope may be provided with an additional element, for example an external flap which extends from an edge of the envelope that is positioned transverse to such direction of insertion; the flap may be provided on at least a part of its surface with sealant or adhesive. On insertion of the envelope into the aperture, the flap may be folded back to overlie a surface of the envelope, either so that the flap contacts the wall of the aperture or, less preferred, so that it contacts the elongate object, if any, within the aperture. By this mean, the envelope/flap assembly may be inserted into the aperture by e.g., hand pressure exerted from within a gap between the flap and the envelope; as the envelope is enlarged by the expansion of the material within it this gap is closed and finally the flap is urged into sealing engagement with the aperture wall. In such an arrangement, only those parts of the flap and the envelope that will contact the aperture wall and the elongate object and any overlapping parts need to be provided with sealant or adhesive. In the case of a duct seal, installed axially from one end of the duct, the edge of the envelope remote from that end of the duct may be provided with an extension to contact the duct wall, and if present the elongate object, provided that due precautions are taken to avoid the binding of such extension against the fixed surfaces as the envelope is inserted. Such extensions may be provided with sealant or adhesive on their contacting surfaces. By this means, internal pressure within the duct will tend to tighten, rather than loosen, the seal in the duct.

As indicated above, the preferred expansible material is a foamable material. Foamable material may be a single or multi-component system, activatable by heat, e.g. acting on a physical blowing agent, or chemical reaction. Heat may, if desired, be provided from a source external to the envelope or from a heater provided within or on the surface of the envelope. The resulting foam may be an open cell or closed cell foam. The expanded material, whether provided by foaming or otherwise, should advantageously be structurally stable, with to accommodate relative movements of the substrate and the aperture caused by, for example, temperature cycling. The foamable material may be a two part polyurethane-producing, a polyester, or an epoxy resin, reaction system.

As indicated above, the foamable material may be premixed and injected into the envelope as it reacts, or one component may be supplied in the envelope, the other being added when the envelope is installed to start the reaction. For example, the two components of a foam may be provided in separate containers that are mixed immediately prior to introduction into the envelope, which may be achieved by a screw threaded engagement between the container and a threaded opening of the envelope. If it is desired or necessary to supply external heat to the expansible material, this may conveniently be achieved by mounting a heating wire on the container. Alternatively, the foam may be positioned in the envelope in a constrained form, for example in the form of a heat-recoverable compressed structure, or a plurality of particulate heat-recoverable compressed foam structures, the application of heat being sufficient to allow the structure or structures to expand, as described in U.S. Pat. No. 3,758,916, the disclosure of which is incorporated by reference herein. The foamed or other expansible material may contain additives, e.g., flame retardants or other fillers, for example good thermal conductors to carry away any heat generated by power cables which might otherwise overheat if the thermal insulating properties of the expanded material are too good.

A primary purpose of the foamable material is to exert internal pressure on the surface of the envelope, to cause at least part thereof or an additional element to come into sealing contact with the interior wall of the aperture. If the contacting portion of the envelope is provided with a sealant or adhesive, as is preferred, then once sealing contact is established and its permanence ensured, it is no longer essential that the pressure be maintained.

The sealant or adhesive provided on the outer surface of the envelope may be, for example, a mastic, a hot-melt adhesive, or other heat-activated adhesive, either alone or in association with foamable material that is allowed to escape from the interior of the envelope through the permeable, e.g., the perforated, wall, mentioned above. The adhesive or sealant if heat-activatable may be activated by the heat generated by an exothermic reaction that causes the foaming of the foamable material, or by a heater that may be provided in or on the envelope, that may also activate the foam. Preferably, the outer surface of the sealant is rendered non-tacky by the use of a release layer, or a powder such as talc, or with a layer of anti-tack coating, for example that described in U.S. Pat. No. 3,415,287, the disclosure of which is incorporated by reference herein, or with a fabric net which becomes embedded within the layer after the latter is forced through the interstices of the net under installation pressure. The sealant or adhesive may instead of being a direct coating on the surface of the envelope, be or be part of an additional element, for example an independent film, layer or self-supporting element, positioned over the appropriate portions of the envelope or aperture or substrate.

The adhesion may be effected by coating one part of a two-part curing system on to the outer surface of the envelope, and covering this with a mesh of the second part. Mixing and curing may then be effected by expansion of the envelope on installation.

As an alternative, the adhesion of the envelope to the aperture may be effected by a coating of depolymerised rubber, acting as a pressure-sensitive adhesive, on its outer surface. No heat is required for its activation, and thus any tendency to melt and flow in operation, for example during load cycling of a cable in a duct is avoided.

The envelope may be provided with a valved tube which, when it is installed will extend from one side of the seal to the other to allow, for example, drainage of water or sampling of gases from within the interior of a duct.

Several embodiments of the method and assembly of the invention will now be described in greater detail, by way of example only, with reference to the accompanying drawings, in which:

FIG. 1 shows one form of envelope constructed in accordance with the present invention;

FIG. 2 is an end view of the expanded envelope in positon for expansion around a cable in a duct;

FIG. 3 is an end view of the expanded envelope sealing the duct;

FIG. 7 is a part longitudinal section of the envelope of FIG. 6 in position for expansion in a duct;

FIG. 8 is an end view of a further embodiment of an envelope constructed in accordance with the present invention in position for expansion in a duct;

FIGS. 9 and 10 are longitudinal sections of further embodiments of the envelope constructed in accordance with the present invention in position for expansion in a duct;

Figure 4:
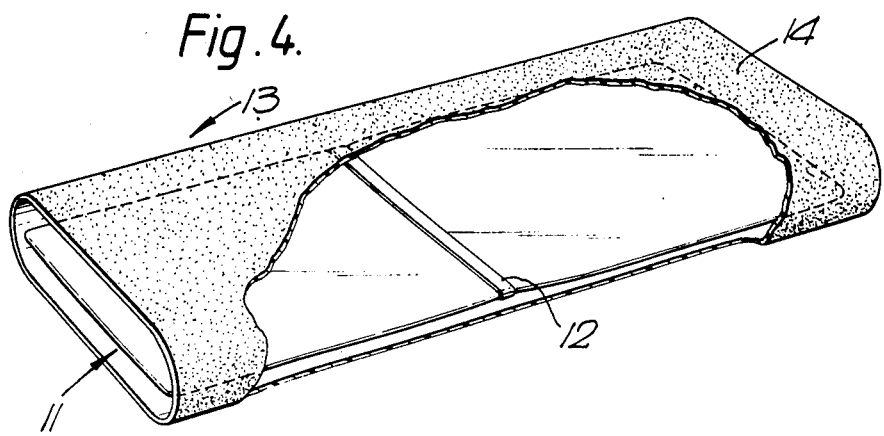
FIG. 4 shows a second embodiment of an envelope constructed in accordance with the present invention.

Referring now more especially to FIGS. 1 to 3, an envelope indicated generally by the reference numeral 1 comprises opposed sheet-like walls 2 and 3 of generally rectangular configuration welded together at their edges, one edge region having an opening 4 from which extends a length of tubing 5. The surfaces 2 and 3 have applied thereto a coating of hot-melt adhesive 6.

As may best be seen from FIG. 2, the envelope is oriented so that the opening 4 is toward the top of the envelope and towards the exterior of the duct as it lies in position around the cable 7 with opposed edges 9, 9' of the envelope lying beneath the cable 7.

In this embodiment a measured amount of foamable liquid is passed through the tube 5 and the opening 4 into the interior of the envelope 1. The liquid quantity is selected to expand the envelope sufficiently to cause it to make sealing contact with the cable 7 and the duct 8. Conveniently, the two components of the foamable liquid are provided in two cans, one of the cans being sufficiently large to accommodate not only the component that is provided in it but also the contents of the other can. When the envelope is in position in the duct, the two components are mixed with shaking in the large can and the opening of the can firmly attached, as by screwing, to the free end of the tube 5.

As shown in FIG. 2, the can 10 is inverted and the whole of its contents are poured into the envelope 1. Foaming is taking place accompanied by an exotherm sufficient to activate the hot-melt adhesive 6 on the outer surfaces of the envelope 1 and cause the adhesive to bond firmly to the wall of the duct 8 and the outer surfaces of the cable 7 to provide a secure seal. Foaming causes an internal pressure increase, which causes expansion in volume, causing the envelope to fill all available space and conform to the duct and the substrate. As will be seen from FIG. 3, the opening 4 is filled with foam, making it possible to remove any source of foamable material.

Figure 5:
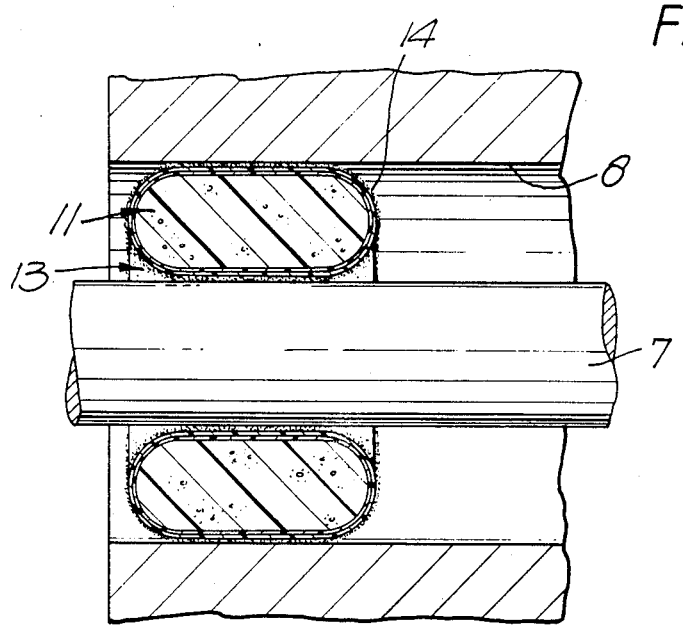
FIG. 5 is a longitudinal section of the expanded envelope of FIG. 4 in the duct.

Referring now more especially to FIGS. 4 and 5, an envelope indicated generally by the reference numeral 11 has a clip 12 dividing it into two compartments. Each compartment contains one component of foamable mixture, the foaming of which is accompanied by an exotherm. The envelope 11 is shown located within a tubular container 13 of cross-linked polymeric material of substantially the same length as the envelope 11 and having a hot-melt adhesive 14 applied to its outer surface. Installation of the assembly around the cable in a duct is carried out by removing the clip 12 from the envelope 11, shaking or otherwise manipulating the envelope to ensure intimate mixing of the contents of the former compartments, positioning the envelope in the tube as shown in FIG. 4 and installing it around the cable 7 in the same manner as described with reference to FIGS. 1 to 3. The exotherm associated with the foaming of the mixture in the envelope 11 is sufficient to activate the hot-melt adhesive 14 on the exterior surface of the tube 13 to provide a waterproof seal about the cable and the duct as shown in FIG. 5 when the envelope has expanded, as a result of foaming, into contact therewith.

Figure 6:
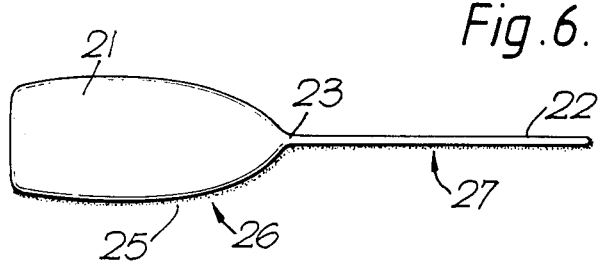
FIG. 6 shows an third embodiment of the envelope constructed in accordance with the present invention.

Referring now more especially to FIGS. 6 and 7 an envelope indicated generally by the reference numeral 21 constructed in accordance with the present invention is provided with a flap 22 extending from an edge 23 of the envelope. The edge 23 is the edge that when the assembly is installed in a duct as shown in FIG. 7 forms the "leading edge", the space 24 between the envelope 21 and the flap 22 assisting in proper location by hand of the envelope in the duct. In this embodiment a hot-melt adhesive 25 is provided on one major surface 26 only of the envelope and the corresponding surface 27 of the flap. The foamable material may be introduced in a manner corresponding to that described with reference to FIGS. 1 to 3 or to that described with reference to FIGS. 4 and 5 as desired.

FIG. 8 illustrates an envelope indicated generally by the reference numeral 31 loosely in position around cables 32, 33, 34 and 35 in the duct 8. The envelope 31 is shaped to conform to and accommodate the plurality of cables, and is provided with re-entrant portions that can overlap each other around respective ones of the cables. In this embodiment it is preferred that the foamable material is introduced through opening 36 as described with reference to FIGS. 1 to 3. The entire outer surface 37 of the envelope has applied thereto a layer 38 of hot-melt adhesive which is activated by the exotherm associated with the mixing and foaming of the foamable materials.

Referring more especially to FIG. 9, in this embodiment an envelope indicated generally by the reference numeral 41 has positioned around part of its surface a separate sheet 42 having applied to its surface not in contact with the envelope 41 a hot-melt adhesive 43. As can be seen, the assembly is inserted into the duct 8 with the sheet 42 facing the interior of the duct and positioned to contact both the duct wall and the cable 7 disposed within it. On activation of the hot-melt adhesive 43 by the exotherm of the foaming material and expansion of the envelope 41 the sheet 42 is forced into sealing engagement with the cable and the duct. The embodiment of FIG. 10 is similar except that the envelope 41 is surrounded by a sheet 52 having a web 53 extending transverse to the axis of the duct and the cable 7 positioned within it and in addition to the parts 54 and 55 of the sheet 52 that correspond to the sheet 42 of FIG. 9 additional webs 56 and 57 are provided that extend toward the interior of the duct 8. The surfaces of the webs 54, 56 that are to engage the duct 8 and the webs 55, 57 that are to engage the cable 7 are provided with a hot-melt adhesive 59. Any excess pressure in the duct will act on the webs 56, 57 to enhance the sealing of the sheet 52 to the duct and the cable.

In this embodiment appropriate forms of heating, e.g. heater 58, may be desirable to ensure melting of the adhesive on the webs 56 and 57.

Figure 11:
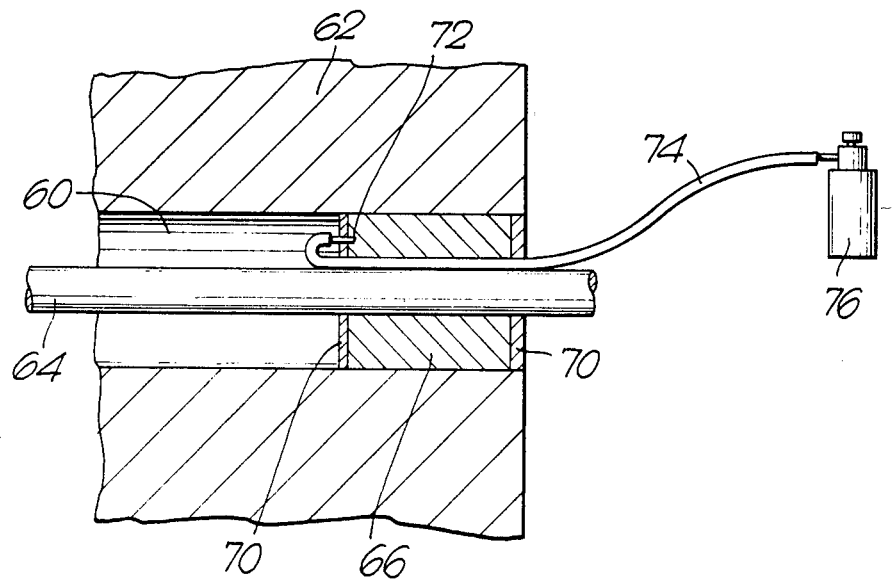
FIG. 11 shows a side elevation of a further embodiment of an assembly forming a fire seal in a duct.
Figure 12:
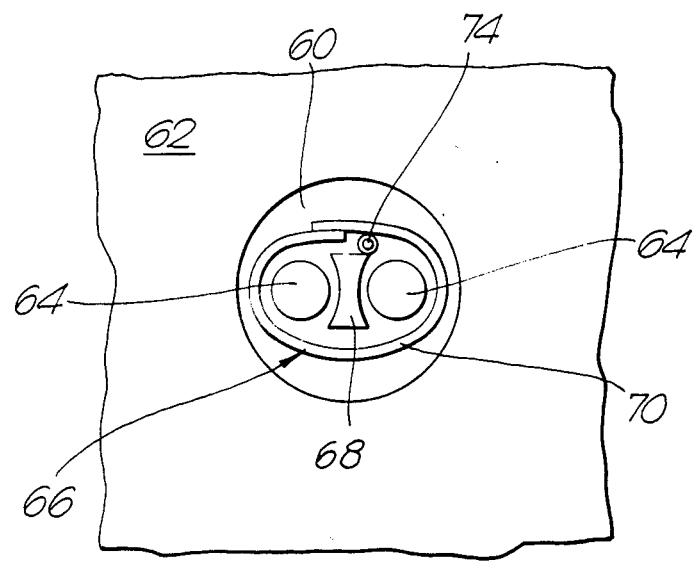
FIG. 12 shows an end view of the assembly of FIG. 11.

Referring to FIGS. 11 and 12, a duct 60 in a wall 62 carries two cables 64 therethrough. An elongate envelope 66 having a hot-melt adhesive on its outer surface is wrapped around both cables 64 and overlaps on to itself. The space between the cables 64 is filled with a wedge 68 which has been kneaded by hand to conform closely to the space between the cables 64 and the envelope 66. The envelope 66 has a coating 70 over its inner and outer end surfaces of a fire resistant intumescent material. A one way, pressure-relief valve 72 is fitted to one end surface of the envelope 66, and has a tube 74 attached thereto. The envelope is installed in the duct 60 with the valve 72 directed towards the interior thereof. The tube 74 is brought out of the duct past the envelope 66, and attached to the nozzle of a pressurised container 76. The container 76 has two separate chambers containing respective components of a two part fire resistant intumescent foam material that are mixed at a valve at the nozzle of the container, that is to say, just before ejection from the container.

Operation of the release knob of the container 76 causes the now-mixed foam composition to flow under pressure along the tube 74 and into the envelope 66 through the valve 72. The time taken for this is such that no significant expansion of the foam takes place before it reaches the envelope 66. The expanding foam then urges the envelope 66 outwards into contact with the wall of the duct 60, the cables 64 and the filler wedge 68. The exotherm consequently generated activates the hot-melt adhesive on the outside of the bag and on the wedge 68, thus ensuring good sealing to the duct and to the cables. The exotherm also activates the fire resistant material 70 at each end of the envelope. Thus, the duct 60 becomes blocked against passage of liquids, gases and fire. When sufficient foam has been introduced into the envelope, the knob on the container 76 is released. The tube 74 is removed from the nozzle, and cut off as close to the exterior of the duct 60 as practicable. The free end of the tube 74 will be sealed by the expanded foam remaining therein.

If too little foam has been injected into the envelope, this will be indicated by the incomplete expansion of the envelope. If too much foam is injected, the valve 72 will operate so as to release the excess foam safely to the interior of the duct 60. It will be appreciated that the delivery of foam from the container may be metered in dependence of the size of the envelope, the size of the duct, and the size and number of cables therein.

It is to be understood that features of the embodiments of the method and assembly of the invention described above may be combined or omitted as required for any particular application.

It will be seen that by the method of the invention there is provided a reliable and simple method of and assembly for sealing a duct or similar elongate aperture. The method has the advantage that no tools are required and the seal can be completed in a comparatively short time, say 5 to 10 minutes. Furthermore, the amount of expansible material can be appropriately pre-selected by the manufacturer for the volume of the envelope, so that the amount of material required is minimised since it is constrained by the envelope to that portion of the aperture where the sealing is required. The containing of the expansible material, for example foam, within the envelope also provides it with environmental protection.

I claim:
1. A method of sealing a duct comprising:
 (a) selecting an envelope having a plurality of perforations on at least a portion of the outer surface thereof and a sealant over at least a portion of said outer surface;
 (b) inserting the envelope into the duct;
 (c) wrapping the envelope over on to itself with the outer surface thereof being positioned to face the interior wall of the duct;
 (d) introducing a curable foamable material into the envelope; and
 (e) allowing the foamable material to foam thereby causing the outer surface of the envelope to come into sealing engagement with the interior wall of the duct, such sealing being enhanced by a small proportion of said foamable material forced through said perforations.

2. A method of sealing a duct having a cable extending therethrough, which method comprises:
 (a) selecting an envelope having an inner and an outer surface and having a plurality of perforations on at least a portion of the outer surface and a sealant over at least a portion of the outer surface;
 (b) inserting the envelope into the duct;
 (c) wrapping the envelope around the cable and over on to itself with the outer surface thereof being positioned to face the interior wall of the duct;
 (d) introducing a curable foamable material into the envelope; and
 (e) allowing the foamable material to foam thereby causing the outer surface of the envelope to come into sealing engagement with the interior wall of the duct, such sealing being enhanced by a small proportion of said foamable material forced through said perforations, and causing the inner surface of the envelope to seal to the cable.

3. An assembly for sealing a duct comprising:
 (a) an envelope having an opening therein for receiving a curable foamable material for expanding the envelope, a plurality of perforations on at least a portion of the outer surface thereof and a sealant over at least a portion of said outer surface; said envelope being arranged to be wrapped on to itself for insertion into a duct;
 (b) a container containing said foamable material; and
 (c) means arranged to connect the container to the envelope to conduct the foamable material thereto for effecting expansion of the envelope so that the outer surface thereof seals to the duct, such sealing being enhanced by a small proportion of said foamable material forced through said perforations.

4. A method as claimed in claim 1 or 2, wherein said envelope has an additional element associated therewith and the additional element has sealant on at least part of its surface.

5. A method as claimed in claim 1 or 2, wherein all parts of the outer surface of the envelope that come into sealing engagement with the interior wall of the duct, have sealant thereon.

6. A method as claimed in claim 2, wherein there is more than one cable in the duct, and wherein sealant is introduced between the cables to enhance the sealing of the duct.

7. A method as claimed in claim 1 or 2, wherein foaming of the foamable material is accompanied by an exotherm.

8. A method as claimed in claim 7, wherein the sealant is heat-activatable, and is activated by the exotherm.

9. A method as claimed in claim 1 or 2, wherein the foamable material is introduced into the envelope when it is installed in the duct.

10. A method as claimed in claim 9, wherein components of the foamable material are mixed to form a reactive foamable liquid which is introduced into the envelope through an opening therein.

11. A method as claimed in claim 10, wherein a tube is fitted to the opening of the envelope, and on insertion of the envelope into the duct, the tube is arranged to extend to the exterior of the duct for conduction of the foamable material into the envelope.

12. A method as claimed in claim 11, wherein the envelope is inserted into the duct with the opening directed towards the inside thereof and with said tube being directed past the envelope to the exterior of the duct.

13. An assembly according to claim 3, wherein the foamable material and/or material of the envelope is fire resistant.

* * * * *